（12）United States Patent
Yagi et al.

(10) Patent No.: US 7,220,794 B2
(45) Date of Patent: May 22, 2007

(54) RUBBER COMPOSITION FOR TIRE TREADS AND A PNEUMATIC TIRE HAVING A TREAD MADE OF SUCH COMPOSITION

(75) Inventors: Noriko Yagi, Kobe (JP); Kiyoshige Muraoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 296 days.

(21) Appl. No.: 09/915,576

(22) Filed: Jul. 27, 2001

(65) Prior Publication Data

US 2002/0040086 A1 Apr. 4, 2002

(30) Foreign Application Priority Data

Jul. 28, 2000 (JP) ............................. 2000-229723

(51) Int. Cl.
*C08K 3/34* (2006.01)
*C08K 3/36* (2006.01)
*C08K 3/04* (2006.01)

(52) U.S. Cl. .................... 524/445; 524/493; 524/495

(58) Field of Classification Search ................ 524/445, 524/446, 474, 493, 495, 497, 449, 450
See application file for complete search history.

(56) References Cited

U.S. PATENT DOCUMENTS 5,591,794 A * 1/1997 Fukumoto et al. .......... 524/447
5,840,795 A * 11/1998 Freeman et al. ............ 524/447
6,080,809 A * 6/2000 Stuhldreher ................ 524/447
6,342,552 B1 * 1/2002 Hergenrother et al. ...... 524/264
6,525,118 B2 * 2/2003 Hergenrother et al. ...... 524/111

FOREIGN PATENT DOCUMENTS

| EP | 0 697 432 A1 | | 2/1996 |
|----|---|---|---|
| EP | 0 875 532 A1 | | 11/1998 |
| EP | 0 894 819 A1 | | 2/1999 |
| EP | 0 894 819 A1 | * | 3/1999 |
| JP | 7-133375 | | 5/1995 |
| JP | 7-149950 | | 6/1995 |
| JP | 7-149954 | | 6/1995 |
| JP | 8-311245 | | 11/1996 |
| JP | 9-31250 | | 2/1997 |
| JP | 9-255814 | | 9/1997 |

* cited by examiner

*Primary Examiner*—Tae H Yoon
(74) *Attorney, Agent, or Firm*—Birch, Stewart, Kolasch & Birch, LLP

(57) ABSTRACT

A rubber composition for tire treads which significantly improves the wet skid performance of the tire, which comprises (A) 100 parts by weight of a diene rubber containing at least 35% by weight of styrene-butadiene rubber, (B) 5 to 50 parts by weight of clay, (C) at least 5 parts by weight of silica having a nitrogen absorption specific surface area of 100 to 300 $m^2/g$ and (D) at least 1 parts by weight of carbon black having a nitrogen absorption specific surface area of 70 to 300 $m^2/g$, wherein, the total amount of (B) clay and (C) silica is at least 30 parts by weight and a total amount of (B) clay, (C) silica and (D) carbon black is at most 100 parts by weight.

5 Claims, No Drawings

RUBBER COMPOSITION FOR TIRE TREADS AND A PNEUMATIC TIRE HAVING A TREAD MADE OF SUCH COMPOSITION

BACKGROUND OF THE INVENTION

The present invention relates to a rubber composition for tire treads and a pneumatic tire having a tread made of the rubber composition, and particularly relates to a rubber composition for tire treads significantly improving tires in grip performance on wet road with remaining low fuel consumption of automobiles and a pneumatic tire having a tread made of the rubber composition.

In recent years, tires for automobiles have required performances, such as the controllability in driving, abrasion resistance, riding comfort as well as the low fuel consumption. Steps taken to achieve such performances include improving braking and driving on wet roads at high driving speed, improving controllability in driving by increasing the grip force on road surfaces, increasing cornering performance by increasing the block stiffness of the tire tread pattern to inhibit the tire from block deformation at cornering, and inhibiting hydroplaining from occurring by inhibiting groove parts on tire tread from deforming to achieve smooth draining. Recently, to satisfy these requirements, tires having an increased grip performance on wet road surface are provided by using rubber compositions obtained by mixing silica with SBR of a high styrene unit content for tire treads.

However, although the rubber compositions for tire treads mentioned above provide an increased grip force at a low temperature range of at most 15° C. of road surface, they do not provide a sufficient grip force on wet or semi-wet road surface. Rubber compositions containing silica decrease in stiffness and decrease significantly in grip force with the repetition of driving. Rubber compositions containing silica have problems such as an increase in Mooney viscosity and a decrease in processability. For example, when extruding, the silica disperse insufficiently in the rubber compositions.

Various proposals have been traditionally made to solve these problems mentioned above. Rubber compositions which are effective in improving the grip performance of tires improve, for example, Japanese unexamined patent publication No. 133375/1995, and No. 311245/1996 which disclose rubber compositions obtained by mixing calcined clay with diene rubbers Japanese unexamined patent publication No. 3373/1996 discloses rubber compositions obtained by mixing vulcanized rubber powders comprising diene rubbers and kaolinite with specific kinds of diene rubbers. As rubber compositions showing the same effects, Japanese unexamined patent publication No. 59893/1996 discloses rubber compositions obtained by mixing specific kinds of inorganic powders and carbon black with SBR comprising specific amount of styrene units, and Japanese unexamined patent publication No. 149954/1995 and No. 31250/1997 disclose rubber compositions obtained by mixing kaolinite base clay with diene rubbers having a specific ratio of 1,2-bond in the butadiene units part.

However, no rubber composition provided shows an excellent wet grip performance with a low heat build up characteristic and without a decrease in processability and a decrease in abrasion resistance.

SUMMARY OF THE INVENTION

One of the objects of the present invention is to provide a rubber composition for tire treads that significantly improves the wet skid performance of tires without decreasing abrasion resistance and increasing rolling resistance, thereby providing an improved pneumatic tire.

The present invention relates to a rubber composition for tire treads, which comprises (A) 100 parts by weight of a diene rubber comprising at least 35% by weight of a styrene-butadiene rubber, (B) 5 to 50 parts by weight of clay, (C) at least 5 parts by weight of silica having a nitrogen absorption specific surface area of 100 to 300 $m^2/g$ and (D) at least 1 parts by weight of carbon black having a nitrogen absorption specific surface area of 70 to 300 $m^2/g$, which has a total amount of (B) clay and (C) silica of at least 30 parts by weight and a total amount of (B) clay, (C) silica and (D) carbon black of at most 100 parts by weight.

The present invention also relates to the above-mentioned rubber composition for tire treads, wherein (B) clay has an average particle size of at largest 10 μm.

The present invention further relates to the above-mentioned rubber composition for tire treads, which comprises (E) a silane coupling agent.

The present invention still further relates to a pneumatic tire which has a tread made of the above-mentioned rubber compositions.

DETAILED DESCRIPTION

A rubber composition of the present invention comprises (A) a diene rubber as a rubber component. Examples of the diene rubber used in the present invention include natural rubber and synthetic diene rubbers such as a styrene-butadiene rubber (SBR), a polybutadiene rubber (BR), a polyisoprene rubber (IR), an ethylene-propylene-diene rubber (EPDM), a chloroprene rubber (CR), an acrylonitrile-butadiene rubber (NBR), and a butyl rubber (IIR).

The diene rubber necessarily comprises at least 35% by weight of SBR, but can comprise at least two kinds of diene rubbers. A diene rubber containing less than 35% by weight of SBR shows decrease in processability at tire production, and does not render low fuel consumption compatible with wet grip performance. The diene rubber comprises preferably 35 to 100% by weight, and more preferably 40 to 100% by weight of SBR from the viewpoint of proccessability.

The SBR rubber comprises preferably 15 to 60% by weight of SBR. A SBR comprising less than 15% by weight of SBR does not provide the desirable grip performance at a low and high temperature range. A SBR comprising more than 60% by weight of SBR does not provide the desirable grip performance because of an excessive increase in block stiffness.

SBR to be used can be produced by any polymerization process such as emulsion polymerization or solution polymerization.

The rubber composition of the present invention contains clay. Clay preferably used has an average particle size of at most 10 μm. Clay having an average particle size of more than 10 μm does not show sufficient reinforcing effect and tends to decrease the abrasion resistance. Clay having too small of an average particle size agglomerates easily, is difficult to disperse in rubber components, and does not provide a rubber composition having desirable performance in some cases. The clay to be used has an average particle size of preferably 0.1 to 10 μm, and more preferably 0.5 to 10 μm from the viewpoint of, for example, the balance among reinforcing performance, wet grip performance, low fuel consumption performance and the like.

The rubber composition of the present invention comprises clay of 5 to 50 parts by weight, preferably 10 to 40 parts by weight. Clay of less than 5 parts by weight provides a low improvement effect in wet grip performance. Clay of more than 50 parts by weight decreases the abrasion resistance.

The rubber composition of the present invention contains silica. Silica is used to supplement the reinforcing performance with clay and to decrease the rolling resistance. The silica has a nitrogen absorption specific surface area ($N_2SA$) of 100 to 300 $m^2/g$, preferably 130 to 280 $m^2/g$. Silica having less than 100 $m^2/g$ of $N_2SA$ shows a low reinforcing effect. Silica having more than 300 $m^2/g$ of $N_2SA$ shows a decreased dispersibility and increases the heat build up characteristic.

Examples of the silica to be used include silica generally used for reinforcing rubbers without limitation, for example, silica from a dry process or silica from a wet process.

The rubber composition of the present invention contains silica of at least 5 parts by weight, and preferably 5 to 85 parts by weight based on 100 parts by weight of the rubber component. Silica of Less than 5 parts by weight does not show a sufficient reinforcing effect or a decrease in the rolling resistance. Silica of more than 85 parts by weight is not advantageous because it increases the heat build up characteristic and decreases processability.

The rubber composition of the present invention contains carbon black. The carbon black to be used has a nitrogen absorption specific surface area ($N_2SA$) of 70 to 300 $m^2/g$, and preferably 90 to 250 $m^2/g$. Carbon black having less than 70 $m^2/g$ of $N_2SA$ finds it difficult to provide sufficient abrasion resistance because of insufficient reinforcing performance. Carbon black having 300 $m^2/g$ of $N_2SA$ shows a low dispersibility and increases the heat build up characteristic. Examples of carbon black are not limited and include HAF, ISAF, and SAF.

The rubber composition of the present invention contains carbon black of at least 1 part by weight, preferably 1 to 70 parts by weight, and more preferably 5 to 65 parts by weight based on the rubber component. Carbon black of less than 1 part by weight shows a low reinforcing performance and a decrease in the abrasion resistance. Carbon black of more than 70 parts by weight shows a low dispersibility and does not provide desirable performances.

The rubber composition of the present invention contains (B) clay and (C) silica in a total amount of 30 to 99 parts by weight based on 100 parts by weight of the rubber component. A total amount of less than 30 parts by weight does not show a sufficient reinforcing effect. A total amount of more than 99 parts by weight shows a decrease in dispersibility and an increase in the heat build up characteristic. The total amount is preferably 40 to 79 parts by weight from the viewpoints of the effects of the addition and the properties.

The rubber composition of the present invention contains (B) clay, (C) silica and (D) carbon black in a total amount of 31 to 100 parts by weight based on 100 parts by weight of the rubber component. The total amount of less than 31 parts by weight does not show a sufficient reinforcing effect. The total amount of more than 100 parts by weight shows a decrease in dispersibility and an increases in the heat build up characteristic. The total amount is preferably 41 to 80 parts by weight from the viewpoints of effects on the addition, and the properties thereof, and the like.

The rubber composition of the present invention can include a silane-coupling agent for strengthening the bonding force between the fillers and the rubber component to show increased abrasion resistance. A silane-coupling agent preferably used is represented by the formula: $Y_3$—Si—$C_nH_{2n}A$. In the formula, Y is an alkyl or alkoxy group having 1 to 4 carbon atoms, or chlorine atom. Each of the three Y's can be the same or different from each other. The subscript n is an integer of 1 to 6. A is a group selected from the group consisting of a —$S_mC_nH_{2n}Si$—$Y_3$ group, a nitroso group, a mercaptan group, an amino group, an epoxy group, a vinyl group, a chlorine atom, an imido group and a —$S_mZ$ group, wherein the subscript m is an integer of 1 to 6, the subscript n and Y are defined above, and Z is selected from the following formulae (1), (2) or (3).

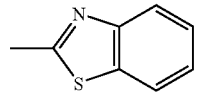

(1)

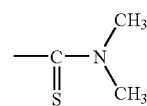

(2)

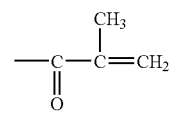

(3)

Examples of the silane-coupling agent include bis(3-triethoxysililpropyl)tetrasulfide, bis(2-triethoxysililethyl) tetrasulfide, bis(3-trimethoxysililpropyl) tetrasulfide, bis(2-trimethoxysililethyl)tetrasulfide,
3-mercaptopropyltrimethoxysilirane, 3-mercaptopropyltriethoxysilane, 2-mercaptoethyltrimethoxysilane, 2-mercaptoethyltriethoxysilane, 3-nitropropyltrimethoxysilane, 3-ntropropyltriethoxysilane, 3-chloropropyltrimethoxysilane, 3-chloropropyltriethoxysilane, 2-chloroethyltrimethoxysilirane, 2-chloroethyltriethoxysilane, 3-trimethoxysililpropyl-N,N-dimethylthiocarbamoyltetrasulfide, 3-triethoxysililpropyl-N,N-dimethylthiocarbamoyltetrasulfide, 2-triethoxysililethyl-N,N-dimethylthiocarbamoyltetrasulfide, 3-trimethoxysililpropylbenzothiazoltetrasulfide,
3-triethoxysililpropylbenzothiazoltetrasulfide, 3-triethoxysililpropylmethacrylatemonosulfide, 3-trimethoxysililpropyl-methacrylatemonosulfide.

Examples of the silane-coupling agent having three Y different from each other include
bis(3-diethoxymethylsililpropyl)tetrasulfide,
3-mercaptopropyldimethoxymethylsilane,
3-nitropropyldimethoxymethylsilane
3-chloropropyldimethoxymethylsilane,
dimethoxymethylsililpropyl-N,N-dimethylthiocarbamoyltetrasulfide,
dimethoxymethylsililpropylbenzothiazoltetrasulfide.
Bis(3-triethoxysililpropyl)tetrasulfide, and
3-trimethoxysililpropylbenzothiazoltetrasulfide are preferable from the viewpoint of the compatibleness between effects of adding the coupling agents and the costs.

The silane-coupling agents can be used singly or in combination of at least two of them.

The silane-coupling agents are used preferably in an amount of 1 to 20% by weight based on the total amount of clay and silica. Silane-coupling agents of less than 1% by weight do not show sufficient effects. More than 20% by weight do not provide increased coupling effects corresponding to the increased cost and decrease in the reinforcing performance and the abrasion resistance. Silane-coupling agents are used preferably in an amount of 2 to 15% by weight from the viewpoints of dispersion effects and coupling effects.

A rubber composition of the present invention can comprise other components or agents used in a general rubber industry such as softners, antioxidants, vulcanization agents, vulcanization accelerators, and vulcanization accelerator assistants as well as rubber components, clay, silica, carbon black, and silane-coupling agents.

The rubber composition for tire treads of the present invention is useful for materials constituting treads of pneumatic tires, and improves the wet grip performance significantly without decreasing the abrasion resistance and the rolling resistance.

The present invention provides a rubber composition for tire treads providing a significantly improved wet skid performance without decreasing the abrasion resistance and without decreasing the rolling resistance of the tires.

EXAMPLES

The present invention is explained in more detail based on the following Examples, but the present invention is not limited thereto.

Raw materials used in Examples and Comparative Examples are shown below.

Natural Rubber: RSS #3 Grade

Diene rubber (SBR): SBR1502 comprising 23.5% by weight of styrene units available from Japan Synthetic Rubber Co., Ltd.

Clay: Crown clay comprising 86% by weight of particles having a size of at largest 2 μm and 4% by weight of particles having a size of larger than 2 μm and at largest 5 μm available from South Eastern Co., Ltd.

Silica: Ultrasil VN3 having 210 m$^2$/g of N$_2$SA available from Deguss Co., Ltd.

Carbon black: SHOWBLACK N220 having 125 m$^2$/g of N$_2$SA available from Showa Cabot K. K.

Silane-coupling agent: Si69 (bis(3-triethoxysililpropyl)tetrasulfide) available from Deguss Co., Ltd.

Aroma oil: JOMO PROCESS X140 available from Japan Energy Corporation.

Antioxidant: NOCRAC 6C (N-(1,3-dimethylbutyl)-N'-phenyl-p-phenylenediamine) available from Ouchishinko Chemical Industrial Co., Ltd.

Stearic acid: available from NOF Corporation.

Zinc oxide: Zinc oxide No. 1 available from Mitsui Mining & Smelting Co., Ltd.

Sulfur: sulfur powders available from Tsurumi Chemical Co., Ltd. Vulcanization accelerator TBBS: Nocceller NS (N-tert-butyl-2-benzothiazylsulfenamide) available from Ouchishinko Chemical Industrial Co., Ltd.

Vulcanization accelerator DPG: Nocceller D (N, N'-diphenylguanidine) available from Ouchishinko Chemical Industrial Co., Ltd.

Evaluation methods used in Examples and Comparative Examples are shown below.

(Abrasion Test)

Lambourn abrasion test was conducted by using a ranbone abrasion tester under the condition of 20° C. of temperature, 20% of slip ratio, and 5 min of testing time. Volume loss of each composition was calculated and indexed according to the following equation based on Comparative Example 1 indexed 100. A high value of the index shows an excellent performance in the abrasion resistance.

(Lambourn abrasion index)=(Volume loss of Comp. Ex. 1)÷(Volume loss of each compositions)×100

(Rolling Resistance Index)

Loss tangent (tan δ) of each composition was measured by using Viscoelastic Spectorometer VES available from Iwamoto Seisakusho K. K. under the condition of 70° C. of temperature, 10% of initial strain, and 2% of dynamic strain, and indexed according to the following equation (Rolling Resistance Index). A high value of the index shows an excellent performance in the rolling resistance.

(Rolling Resistance Index)=(tan δ of Comp. Ex. 1)÷(tan δ of each composition)×100

(Wet Skid Test)

Skid resistance was measured by using a potable skid resistance tester available from Stanley Co., Ltd. according to ASTM E303-83 under 25° C., and indexed according to the following equation (Wet Skid Index). A high value of the index shows an excellent performance in the wet skid performance.

(Wet Skid Index)=(Skid resistance of each composition)÷(Skid resistance of Comp. Ex. 1)×100

Examples 1 to 4 and Comparative Examples 1 to 6

Each of rubber compositions for tests was obtained by mixing the components according to the proportion shown in Table 1. Vulcanized rubber compositions were obtained by vulcanizing the rubber compositions with pressing under 170° C. for 20 min.

Results are shown in Table 1.

TABLE 1

|  | Ex. 1 | Ex. 2 | Ex. 3 | Ex. 4 | Com. Ex. 1 | Com. Ex. 2 | Com. Ex. 3 | Com. Ex. 4 | Com. Ex. 5 | Com. Ex. 6 |
| --- | --- | --- | --- | --- | --- | --- | --- | --- | --- | --- |
| Raw materials (parts by weight) | | | | | | | | | | |
| Natural Rubber | — | — | — | 65 | — | — | — | — | 75 | — |
| SBR | 100 | 100 | 100 | 35 | 100 | 100 | 100 | 100 | 25 | 100 |
| Clay | 5 | 15 | 30 | 10 | — | — | — | 10 | 10 | 10 |
| Silica | 30 | 20 | 20 | 20 | 60 | — | 30 | 10 | 10 | 40 |
| Carbon Black | 25 | 25 | 25 | 30 | — | 60 | 30 | 40 | 40 | 60 |
| Silane-Coupling Agent | 3.5 | 3.5 | 5 | 3 | 6 | — | 3 | 2 | 2 | 5 |

TABLE 1-continued

|  | Ex. 1 | Ex. 2 | Ex. 3 | Ex. 4 | Com. Ex. 1 | Com. Ex. 2 | Com. Ex. 3 | Com. Ex. 4 | Com. Ex. 5 | Com. Ex. 6 |
| --- | --- | --- | --- | --- | --- | --- | --- | --- | --- | --- |
| Aromatic Oil | 8 | 8 | 8 | 8 | 20 | 20 | 20 | 8 | 8 | 15 |
| Antioxidant | 1 | 1 | 1 | 1 | 1 | 1 | 1 | 1 | 1 | 1 |
| Stearic Acid | 2 | 2 | 2 | 2 | 2 | 2 | 2 | 2 | 2 | 2 |
| Zinc Oxid | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 |
| Vulcanization accelerator TBBS | 1 | 1 | 1 | 1 | 1 | 1 | 1 | 1 | 1 | 1 |
| Vulcanization accelerator DPG | 0.5 | 0.5 | 0.5 | 0.5 | 0.5 | 0.5 | 0.5 | 0.5 | 0.5 | 0.5 |
| Characteristics |  |  |  |  |  |  |  |  |  |  |
| Ranbone Abrasion Index | 107 | 106 | 103 | 102 | 100 | 112 | 105 | 109 | 107 | 104 |
| Rolling Resistance Index | 102 | 105 | 108 | 101 | 100 | 83 | 95 | 94 | 87 | 80 |
| Wet Skid Index | 110 | 116 | 120 | 102 | 100 | 85 | 91 | 90 | 84 | 93 |

Improved wet skid performances were shown without a decrease in abrasion resistance and without a decrease in rolling resistances in Examples 1 to 4 wherein (B) clay, (C) silica and (D) carbon black were used in combination with defined proportions.

Insufficient wet skid performances were provided in Comparative Examples 1 to 3 wherein each of (C) silica and (D) carbon black was used singly or (C) silica and (D) carbon black were used in combination without (B) clay. Insufficient wet skid performances and rolling resistances were provided in Comparative Examples 4 and 5 wherein (B) clay, (C) silica and (D) carbon black were used in combination with a total amount of less than 30 parts by weight of (B) clay and (C) silica based on 100 parts by weight of the rubber component, and in Comparative Example 6 wherein (B) clay, (C) silica and (D) carbon black were used in a total amount of more than 100 parts by weight.

What is claimed is:

1. A rubber composition for tire treads, which comprises (A) 100 parts by weight of a diene rubber comprising at least 35% by weight of a styrene-butadiene rubber, (B) 30 to 50 parts by weight of clay (C) at least 5 parts by weight of silica having a nitrogen absorption specific surface area of 100 to 300 m2/g and (D) at least one part by weight of carbon black having a nitrogen absorption specific surface area of 70 to 300 m2/g, and having a total amount of (B) clay and (C) silica of 40 to 79 parts by weight and a total amount of (B) clay and, (C) silica and (D) carbon black of 41 to 80 parts by weight, wherein (B) clay has an average particle size of 0.5 to 10 μm.

2. The rubber composition for tire treads of claim 1, which includes (E) a silane-coupling agent.

3. A pneumatic tire, which has a tread made of the rubber composition of claim 1.

4. A pneumatic tire, which has a tread made of the rubber composition of claim 2.

5. The rubber composition of claim 1, wherein clay is present in an amount of 30 parts by weight, silica is present in an amount of 20 parts by weight and carbon black is present in an amount of 25 parts by weight.

* * * * *